United States Patent

Hagmann

[15] 3,671,046
[45] June 20, 1972

[54] RING SEAL WITH SPECIAL GROOVE CONFIGURATION

[72] Inventor: Foster M. Hagmann, 130 N. Bristol Avenue, Los Angeles, Calif. 90049

[22] Filed: March 3, 1970

[21] Appl. No.: 16,008

[52] U.S. Cl. .................................................. 277/170
[51] Int. Cl. ............................................... F16j 15/06
[58] Field of Search ......................... 277/170–172, 205–211

[56] References Cited

UNITED STATES PATENTS

| 392,931 | 11/1888 | Prindle | 277/170 |
| 930,297 | 8/1909 | Lorenz | 277/170 |

FOREIGN PATENTS OR APPLICATIONS

| 534,119 | 2/1941 | Great Britain | 277/170 |

Primary Examiner—Robert I. Smith
Attorney—Fulwider, Patton, Rieber, Lee & Utecht

[57] ABSTRACT

A fluid seal in which an endless sealing element composed of resilient deformable material and having a polygonal cross-section is deformed into a groove formed with an inclined sidewall which progressively reduces the depth of the groove on one side, the volume-void relationship of the groove and the element being such that one exposed side of the element is wedged along the inclined sidewall to a reduced thickness and to an intermediate position along the incline when the element and groove are of nominal dimension conditions, and is wedged a greater or lesser distance along the incline with other variations within permissible tolerances. Alternative embodiments include a closure with a sealing element on one side; a retainer with sealing elements in back-to-back relation; and a second retainer with sealing elements on the remote sides of two separable retaining rings and with a double element between the rings, the retaining rings being specially joined and formed to accommodate separation of the sealed surfaces while maintaining an effective seal.

22 Claims, 10 Drawing Figures

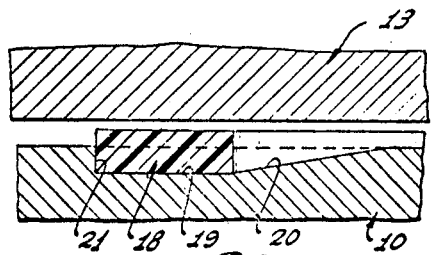
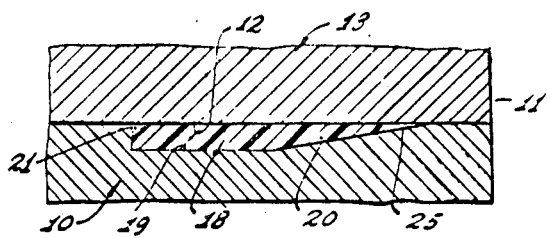
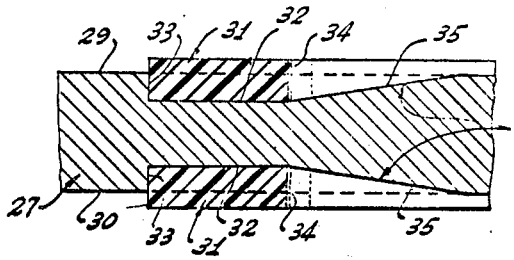
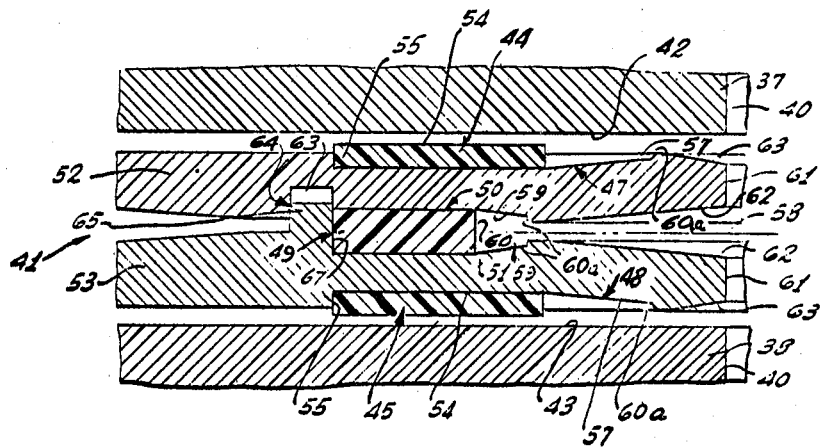
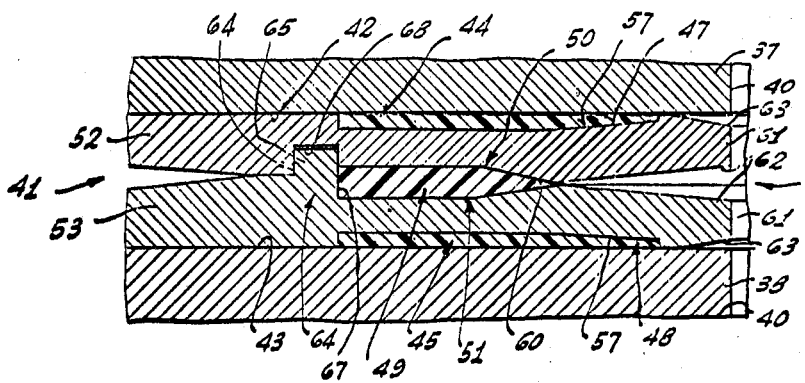

RING SEAL WITH SPECIAL GROOVE CONFIGURATION

BACKGROUND OF THE INVENTION

This invention relates generally to fluid seals and, more particularly, to a seal with resilient deformable sealing or packing element disposed in an endless groove in one of a pair of members to be sealed with a portion initially projecting out of the groove to be deformed into the groove by the other member so as to provide a sealing barrier between the abutting or "faying" surfaces of the members.

For example, one of the members to be sealed may be a closure member clamped against the end surface of a receptacle, the sealing element being disposed in a groove in either the closure or in the end surface. As another example, the element may be disposed between a pipe flange and a ring-like retainer clamped against the pipe flange, typically with a second pipe flange clamped against the opposite side of the retainer, the latter having seal grooves in both of its sides supporting sealing elements for engagement with both pipe flanges. Each sealing element is composed of a resilient deformable material, such as rubber, and is deformed into the associated groove so as to exert a yieldable sealing force against the abutting surface as well as the groove walls.

For optimum sealing effectiveness and seal life, the total volume of the sealing element is closely correlated with the size of the void defined by the groove. It is no greater than the void so that the sealing element will be received completely within the groove, but fills the groove to the greatest practical extent so that as much as possible of the surface of the seal is directly supported by the surfaces of the groove and the abutting member. Such support is important because resilient sealing materials tend to take a permanent set when unsupported under compressive forces, thus losing their resilience.

On the other hand, allowances must be made in mass-produced parts for dimensional variations within permissible tolerances, so sealing elements customarily have total volumes somewhat less than the voids defined by the grooves in which the elements are to be installed. As a practical matter, the maximum volume of a sealing element, within permissible tolerance variations, should be no greater than the minimum void within permissible tolerances, and preferably is slightly less than the minimum void to accommodate swelling of the element in use.

As a result of these practical considerations, a substantial portion of the groove for a resilient sealing element such as an O-ring often remains unfilled, particularly with adverse tolerance accumulations (e.g., when the O-ring is undersize and the groove is average), and a corresponding amount of the surface area of the seal is unsupported and exposed, on at least one side, for contact with the fluid that is being sealed. Thus, in addition to the adverse effect of setting of the unsupported material, the exposure of a substantial amount of surface area of the element to the sealed fluid can result in early failure. On the other hand, if the sealing element is made to fill the groove completely when the element and groove are both of nominal dimensions, adverse tolerance accumulations and swelling can lead to overfilling of the groove, failure of the faying surfaces to meet, and resultant extruding of the sealing material between the surfaces. This condition is intolerable since when any appreciable fluid pressure is encountered, a sealing failure will occur.

SUMMARY OF THE INVENTION

The present invention resides in the combination of an endless sealing element of resilient deformable material and a supporting member that is formed with a groove of special configuration for receiving the entire volume of the element. This construction minimizes the amount of unsupported and exposed surface area of the element within the groove, notwithstanding adverse tolerance accumulations, so as to avoid the foregoing causes of early failure without sacrificing the ability to mass-produce the parts at a competitive cost.

In the preferred embodiment shown herein, the sealing element is of uniform, generally polygonal, or flat-sided, cross-section for ease of manufacture, and the groove has at least one sidewall that is inclined outwardly and away from the other sidewall at a preselected angle with the faying surface of the grooved member to progressively reduce the depth of the groove on one side. In its relaxed or free condition, the element rests against the bottom of the groove with a portion projecting out of the groove for engagement with the faying surface of the other member so as to be deformed completely into and confined within the groove when the faying surfaces are together. To accommodate tolerance accumulations, swelling and the like, the total volume of the sealing element and the size of the void defined by the groove are correlated so that the side of the element facing toward the inclined sidewall of the groove will be deformed along the inclined sidewall to a progressively decreasing thickness, depending upon how far the side of the element travels along the incline.

With this arrangement, the nominal dimensions of the element and the groove are selected so that the deformed side of the element will be wedged along the incline to an intermediate position in spaced relation with both the faying surface and the bottom of the incline, preferably approximately midway between the two. Accordingly, an increase in the volume of the sealing element, within permissible tolerances, relative to the size of void can be accommodated within the space along the incline beyond the intermediate position, and a reduction of seal volume relative to the void results in deformation of the seal a lesser distance along the incline.

The free or wedged side of the sealing element is narrower than the depth of the groove, the inclined sidewall of which extends toward the source of pressure being sealed. For proper sealing, the angle of the incline is between 5° and 27° with the surface, and the thickness of the wedged side of the seal is less than 0.015 inch to take advantage of the fact that resilient seal materials presently in use become substantially self-supporting in thicknesses less than this amount. The thickness in the mean tolerance condition should be on the order of 0.007 inch. For the same reason, the amount of free rise of the seal out of the groove should be limited to less than 0.015 inch.

Other features and advantages of the invention will be apparent from the following detailed description, taken in conjunction with the accompanying drawings.

BRIEF DESCRIPTION OF THE DRAWINGS

FIGS. 6 and 7 are views similar to FIGS. 4 and 5 showing the open and sealed conditions, respectively, of the parts with maximum sealing element volume relative to the void;

FIG. 8 is an enlarged fragmentary cross-sectional view showing the invention as applied to a ring-like retainer for use between pipe flanges and the like;

FIG. 9 is an enlarged fragmentary cross-sectional view of another application of the invention, specifically, a double-ring retainer for accommodating separation of sealed pipe flanges on opposite sides of the retainer, the flanges being shown in a separated condition prior to sealing; and FIG. 10 is a view similar to FIG. 9 showing the double-ring retainer in sealing relation with the flanges and tightly clamped together.

DETAILED DESCRIPTION OF THE FIRST EMBODIMENT

Figure 1:
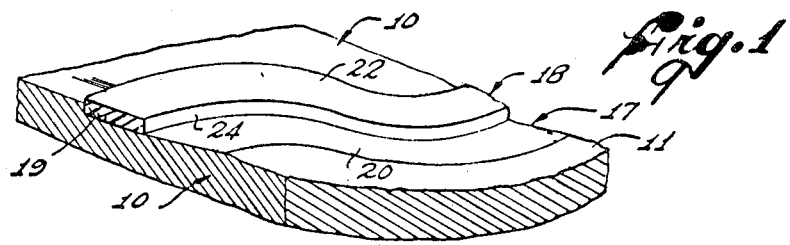
FIG. 1 is a fragmentary perspective view, on an enlarged scale, of a section of a closure member with a sealing element and groove embodying the novel features of the present invention, the closure member being engageable with the end surface of a receptacle as shown in FIGS. 2 and 3.
Figure 2:
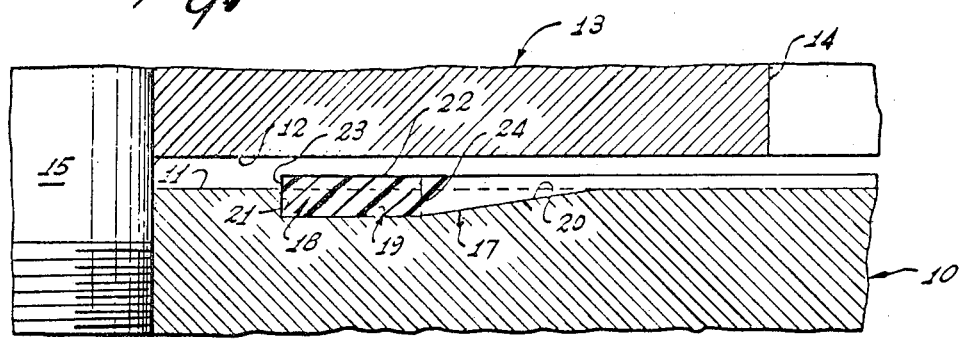
FIG. 2 is an enlarged fragmentary cross-sectional view showing the closure member of FIG. 1 with a receptacle but in spaced, or open, relation therewith.
Figure 3:
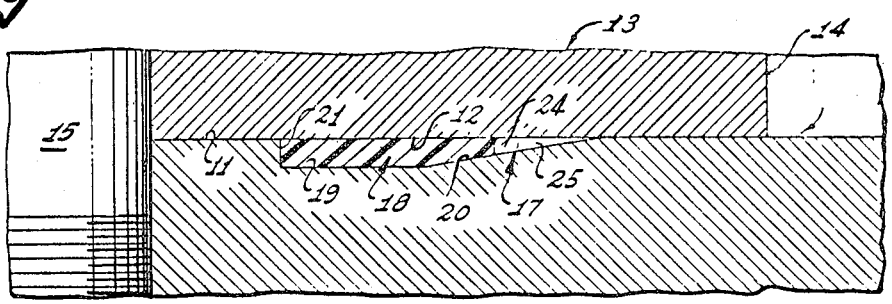
FIG. 3 is a view similar to FIG. 2 showing the closed and sealed relation of the parts, and illustrating the mean tolerance condition of the sealing element and the groove.

As shown in FIGS. 1 through 7, the invention is incorporated in a closure member 10 having a substantially flat surface 11 engageable with an end surface 12 of a receptacle 13 (FIGS. 2–7) formed with an opening 14 for containing a body of fluid under pressure. The closure member is designed to be clamped against the receptacle by suitable fastening means such as a plurality of bolts 15, one such bolt being shown in FIGS. 2 and 3. An endless seal groove 17 extends completely around the opening in the receptacle with a sealing element 18, composed of resilient deformable material, fitted in the groove for sealing engagement with the end surface 12 of the receptacle when the closure is clamped in place as shown in FIG. 3. The sealing element may be composed of any suitable resilient deformable material, but preferably is made of synthetic rubber of high resilience.

Although the groove 17 may be circular for engagement with an annular end surface of a receptacle, the portion of the groove shown in FIG. 1 is irregularly shaped to illustrate the capability of following an irregularly shaped end surface 12. Moreover, it will be apparent that the closure and the receptacle may be disposed in any desired orientation, and need not be vertically disposed as shown herein for illustration only.

In keeping with conventional practice, the sealing element 18 abuts against the bottom wall 19 of the groove 17 and preferably is bonded thereto in order to facilitate handling of the closure. The outer portion of the element projects outwardly beyond the surface 11 of the closure to engage the end surface 12 and be deformed into the groove as the closure is clamped into place against the receptacle, the total void space defined by the groove being greater than the volume of the element so as to receive the deformed element completely within the groove when the surfaces 11, 12 are together. Thus, the resilience of the element attempting to restore the latter to its original form causes the element to press tightly against the end surface 12, forming a sealing barrier against the escape of fluid from the opening 14 between the surfaces 11, 12.

The foregoing general statements are applicable to resilient deformable seals of various configurations, including conventional O-ring seals having circular cross-sections and deformed into the usual grooves of rectangular cross-section. As is well known in the art, the volume-void relationship between a sealing element and the associated groove, whether an O-ring or a specially shaped resilient packing, must be carefully controlled to obtain optimum support of the surface area of the resilient element to minimize setting while avoiding overfilling of the groove as a result of either adverse tolerance accumulation or swelling of the seal after installation.

In accordance with the present invention, the sealing element 18 and the groove 17 are specially shaped for economical mass-production and to limit the amount of unsupported surface area of the sealing element after assembly, despite variations in the dimensions of the seal and the groove within acceptable manufacturing tolerances, to take advantage of the self-supporting characteristic of seal materials within a range of controlled thicknesses, and to minimize the exposure of the seal to corrosive fluid, even when a maximum permissible clearance exists in the groove. Moreover, the novel combination of sealing element and groove causes the pressure of the fluid to act against the element in a manner which sets the element firmly against the faying surfaces rather than tending to separate the element from the surfaces.

To the foregoing ends, the sealing element 18 is of uniform, generally polygonal cross-section, preferably rectangular so as to be easily die-cut as a flat band from flat sock, and the groove 17 is made shallower than the thickness of the seal by a preselected amount and has, at least on one side, an outwardly inclined sidewall 20 disposed at a preselected angle with the surface 11 to progressively reduce the depth of the groove on that side. This inclined sidewall accommodates the volume of seal material that is deformed into the groove as the two surfaces 11, 12 are brought together. Moreover, the void-volume relationship is such that the sealing element is deformed part way along the inclined sidewall in the mean tolerance condition and, even with maximum void and minimum volume, will be disposed along the incline at a point where the depth of the groove and thickness of the exposed side of the seal are reduced to less than the thickness of the seal material that is substantially self-supporting.

In this instance, the groove 17 has a flat bottom wall 19 parallel to the surface 11 with the inclined sidewall 20 along the side of the groove that is adjacent the opening 14 in the receptacle 13, and has a second sidewall 21 along the other side of the groove. While the second sidewall may be disposed at various angles relative to the surface 11, including an incline similar to that of the sidewall 20, it is shown as normal to the surface so as to meet both the surface and the bottom wall 19 at right angles.

Figure 4:
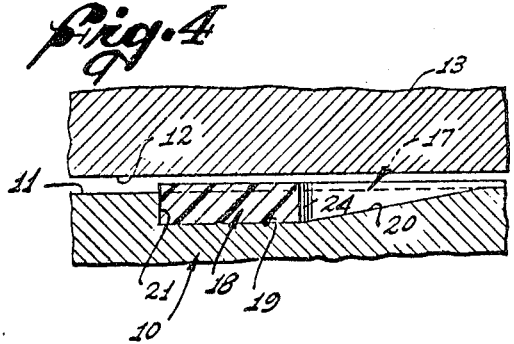
FIGS. 4 and 5 are partial cross-sectional views similar to parts of FIGS. 2 and 3 and showing the open and sealed conditions, respectively, of the parts with minimum sealing element volume relative to the void.

The width of the sealing element 18 preferably is the same as the width of the bottom wall 19 so that the element extends from the sidewall 21 to the juncture of the bottom wall and the inclined sidewall 20 in the free condition shown in FIGS. 2, 4, and 6. An illustrative width is 0.100 inch, although it will be readily apparent that other widths may be used to suit the particular circumstances of a given seal application.

For proper sealing, the angle of inclination of the sidewall 20 relative to the surface 11 should be between 5° and 27° the preferred angle shown for purposes of illustration being about 10°. This range of angles produces proper flow of the seal material in the groove during movement of the parts 10 and 13 toward each other, and reduces the depth of the groove on one side at a rate that results in optimum support of the material at the exposed side thereof.

The amount of rise or projection of the sealing element above the surface 11 (above the broken line in FIG. 2) preferably is limited to less than 0.015 inch to take advantage of the self-supporting characteristics of rubber in this range of thicknesses, thereby insuring that the seal material will be deformed toward and along the incline rather than to overhang the surface 1 around the groove and be pinched between the surfaces 11 and 12. A satisfactory groove depth is on the order of 0.022 inch, and a corresponding seal thickness is on the order of 0.030 to 0.034 inch, thereby producing a seal squeeze of roughly 33 percent. The volume of seal material initially disposed outside the groove is no greater than the size of the void between the sealing element and the end of the inclined sidewall 20 of the groove.

Figure 5:
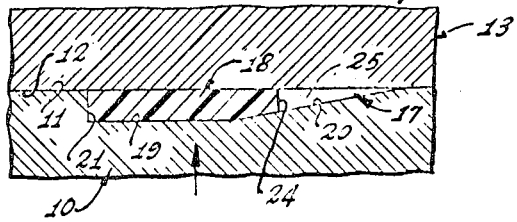

As the closure member 10 is drawn toward the surface 12 of the receptacle 13 from the open positions shown in FIGS. 2, 4, and 6 to the sealed positions shown in FIGS. 3, 5, and 7, the surface 12 engages the outer side 22 of the sealing element 18 and applies a compressive, squeezing force to the latter to deform the element into the groove 17. Since the left side 23 of the element abuts against the adjacent sidewall 21 of the groove and the right side 24 is unsupported, the compressive force causes the right side to bulge to the right and move along the inclined sidewall 20, reducing the thickness of the exposed side progressively as it travels along the incline.

When the surfaces 11 and 12 are together, the exposed side 24 of the seal assumes a position that is determined by the volume of the sealing element relative to the size of the void defined by the groove, this position being approximately midway along the inclined wall 20 when the groove and the sealing element are of nominal dimensions, or have the mean dimensions within the tolerance range, and closer to either the bottom or the top of the incline, respectively, when the volume of the element or the void of the groove, or both, are such that the degree of fill, within permissible tolerances, is more or less. It will be appreciated that the volume of the seal and the size of the void are proportional to the cross-sectional areas shown in the drawings, and that reference may be made to relative areas in comparing relative volumes.

With the inclined sidewall 20 on the side of the groove 17 adjacent the source of pressure being sealed, the remaining space 25 in the groove will be filled with the fluid, and the pressure of the fluid thus acts against the exposed side 24 of the sealing element 18. The pressure of the fluid is transmitted through the seal material and is added to the force produced by the resilience of the deformed material, thereby to enhance the sealing pressure exerted against the surface 12 along the top of the seal as well as against the walls of the groove.

It should be noted that, while the effective sealing lines are adjacent the wedged and exposed side 24 of the sealing element 18, the upper side 22 of the element is in flat sealing engagement with the surface 12 across the full width of the element, and the effective sealing width of this side remains substantially the same even if the pressure in the system is high enough to cause the faying surfaces 11, 12 to begin to separate. Moreover, an increase in fluid pressure is accompanied by a corresponding increase in the force transmitted through the element to the flat upper and lower surfaces of the element, so the seal can tolerate separation of the faying surfaces under extreme circumstances to a greater extent than has been possible in conventional seals, even to the extent of temporarily exceeding the original amount of rise of the element 18 out of the groove 17.

The only unsupported surface area of the sealing element 18 is the wedged and exposed side 24, so this is the only area that is subject to any appreciable tendency to set and lose its resilience. Setting of this exposed area is negligible, however, because of the limited thickness of the exposed side and the self-supporting characteristic of rubber when wedged to a thickness on the order of 0.014 inch or less.

Another advantage of the reduced, exposed surface area is the limiting of the area that is in contact with the sealed fluid, which in some instances attacks and degrades the seal material. With the exposed side reduced to a thickness on the order of 0.014 inch or less, degradation of the seal is minimized.

DESCRIPTION OF THE SECOND EMBODIMENT

A modified but very similar form of the invention is illustrated in FIG. 8, in which the grooved member 27 is a ring-like retainer, only a portion of which is shown, the retainer being designed for placement between opposed surfaces such as pipe flanges (not shown). Endless grooves 28 similar to the groove 17 are formed in each of its opposite flat side surfaces 29 and 30, in back-to-back relation, and a resilient deformable sealing element 31 is fitting in each groove, bonded to the bottom wall 32 of the groove in contact with one sidewall 33 thereof, and dimensioned to be pressed and deformed fully into the groove so that one side 34 of the element is bulged along an inclined sidewall 35 of the groove, in the manner described hereinbefore.

The same design considerations and parameters are applicable, and the same sealing performance is obtained on each side of the retainer 27, each seal engaging one of the pipe flanges to form a sealing barrier between the flange and the adjacent side of the retainer. If the flanges begin to separate, both seals have the capability of following the separating flange to some extent and maintaining an effectively sealed joint.

DESCRIPTION OF THE THIRD EMBODIMENT

The form of the invention shown in FIGS. 9 and 10 also is designed for use between adjacent pipe flanges 37 and 38, shown partially and in spaced-apart relation in FIG. 9 and each surrounding a center hole 40. In this instance, however, a two-part, ring-like retainer 41 is disposed between the opposed surfaces 42 and 43 of the pipe flanges, and has two sealing elements 44 and 45 in oppositely opening grooves 47 and 48 in the remote sides of the retainer, that is, the sides adjacent the pipe flanges. A third sealing element 49 is fitted in aligned grooves 50 and 51 in the adjacent sides of two side-by-side rings 52 and 53 constituting the retainer. Thus, the sealing elements 44 and 45 seal between the two-piece retainer 41 and the two pipe flanges 37 and 38, and the element 49 seals between the two parts of the retainer.

The grooves 47 and 48 preferably are similarly shaped in cross-section, having a flat bottom wall 54, sidewall 55, and an inclined sidewall 57 on the inner side of the groove adjacent the pressure source, and are dimensioned, in accordance with the considerations previously discussed, so that the sealing elements 44 and 45 are deformed completely into the grooves and along the inclined sidewalls 57 as the flanges 37 and 38 are drawn into tight engagement with the opposite sides of the retainer.

Normally, the two rings 52 and 53 of the retainer 41 will be clamped tightly together in the manner shown in FIG. 10 when the retainer is clamped between the flanges, and the central seal 49 will be confined between the rings in the void defined by the two aligned grooves 50 and 51 in the adjacent sides of the retainer rings. It will be seen in FIGS. 9 and 10 that the sealing element 50 may be considered as two elements integrally joined together in a central plane through the element 50, indicated at 58 in FIG. 9, the two parts of the element above and below this plane being resiliently deformable into the respective grooves 50, 51 as the retainer rings are clamped together.

Each integral part of the central element 50 has the desired void-volume relationship with its associated groove, 50, 51, and the grooves have inclined sidewalls 59 on the sides adjacent the source of fluid so that the element is deformed to the right along both of the inclined sidewalls in the manner previously described, substantially filling the grooves but to a varying degree determined by the volume of the element relative to voids of the grooves. Again, the position of the deformed side 60 of the element 49 along the inclined sidewalls 59 depends upon the effect of tolerance accumulations.

In each of the grooves 47, 48 and 51 in this form, the inclined sidewall 57, 59 terminates in a slight shoulder 60a at the shallow side of the groove, such shoulders being disposed at or beyond the maximum extent of travel of the adjacent sides of the sealing elements so as not to interfere with the proper deformation and flow of the seal.

Between the central grooves 50 and 51 and the inner edges 61 of the rings 52 and 53, the adjacent side surfaces of the rings first are parallel to form narrow annular abutting surfaces, and then diverge from each other at 62 to form a clearance space between the inner edge portions to receive fluid under pressure from the center of the retainer. On the remote sides of the retainer are similarly inclined surfaces 63 diverging from the pipe flanges beyond narrow annular abutting surfaces parallel to the flanges, but these diverging surfaces are radially shorter, and thus of less surface area, than the surfaces 62.

With this arrangement, the fluid in the system acts upon both the adjacent surfaces 62 and the remote surfaces 63 to exert opposing forces on each of the rings 52 and 53, but the greater inside surface area exposed to pressure fluid results in a net force urging each ring away from the other ring and toward the adjacent pipe flange 37, 38. Thus, if the flanges begin to separate, as is often the case in service use, each ring follows the adjacent flange and maintains the associated seal 44, 45 in tight sealing contact with the flange. The accompanying separation of the retaining rings, toward the condition of the rings shown in FIG. 9, results in enlargement of the void defined by the grooves 50 and 51, and permits the central sealing element 49 to expand toward the condition shown in FIG. 9.

As previously mentioned, however, the inherent resilience of the seal material maintains sealing contact between the element 49 and the bottom walls of the two grooves 50 and 51 at least until the seal approaches its free thickness, and the force exerted by the fluid on the inner or right side of the elements acts to expand the element even further so as to maintain effective sealing contact between the separated rings. To prevent the element from being blown out of its grooves, to the left in FIGS. 9 and 10, during such separation of the rings, an annular tongue-and-groove connection 64 is formed between the rings along the outer or left sides of the grooves 50 and 51, the tongue of the connection herein being a raised annular rib 65 on the lower ring 53 having a common sidewall 67 with the seal groove 51, and fitting snugly but slidably into an aligned groove 68 in the ring 52. The rib 65 thus forms the outer sidewalls of both of the seal grooves 50 and 51.

Accordingly, separation of the retaining rings 52 and 53 to an extent less than the height of the rib 65 does not open the left or outer sides of the sealing grooves 50 and 51, and the seal 49 remains firmly backed against blowing out of the retainer 41 or extruding between the rings. Of course, the tongue-and-groove connection also serves to key the retaining rings together against relative edgewise motion.

From the foregoing, it will be seen that the present invention, in its broadest aspect, provides a seal utilizing a resilient deformable sealing element preferably of polygonal cross-section, that is disposed in a retaining groove having at least one sidewall inclined at an angle within the prescribed range of angles. The sealing element has a volume (or cross-sectional area) that is correlated with the void (or cross-sectional area) of the groove to insure that one exposed side of the element is deformed part way along the inclined sidewall of the groove to reduce the thickness of the exposed side according to the distance it travels along the inclined sidewall. This distance in turn, depends upon the relative cross-sectional areas of the parts within permissible tolerances, the exposed side being approximately midway or centrally along the incline with the nominal dimension condition, closely adjacent the shallow end of the incline with maximum volume and minimum void, and below the central position with minimum volume and maximum void.

In addition, the correlation of the sizes and angle to insure that the exposed edge is reduced to 0.014 of an inch or less takes advantage of the self-supporting characteristic of rubber when wedged to less than this thickness, thus substantially eliminating any significant setting of the element in use. Since the sealing elements may be simply die-cut from sheet stock, the low-cost mass-production techniques may be used to produce the elements.

The three different illustrative embodiments show various ways that the seal may be employed, all using the same novel concepts with respect to the combination of a sealing element of polygonal cross-section and a retaining groove with a specially inclined sidewall for accommodating variations within permissible tolerances. In addition, the embodiment of FIGS. 9 and 10 represents a seal assembly for accommodating separation of sealed pipe flanges and the like, using the basic seal of the present invention with separable retaining rings that have a tongue-and-groove connection for maintaining outside backing for the central seal while also maintaining the other seals in sealing engagement with the separating pipe flanges.

It also will be evident that, while three embodiments of the invention have been illustrated and described, various changes and modifications may be made without departing from the spirit and scope of the invention.

I claim:

1. A seal for use between first and second members having surfaces to be sealed, said seal comprising:

means on said first member defining an endless groove in the surface thereof, including a bottom wall spaced inwardly from and generally parallel to the surface, a first sidewall along one side of said groove generally normal to the surface and said bottom wall, and a second sidewall along the other side of said groove and inclined from said bottom wall toward the surface generally at an angle between five and twenty-seven degrees with the surface to reduce the depth of the groove progressively toward the surface on said other side;

and an endless sealing element composed of resilient deformable material and having a generally rectangular cross-section and approximately the same width as said bottom wall, said sealing element being disposed in said groove against said bottom wall and said first sidewall and having a top projecting beyond the surface;

the volume of said sealing element being less than the void defined by said groove so that one side of the element is deformed along said inclined sidewall into an intermediate position between said bottom wall and the surface when the sealing element is deformed completely into and confined within the groove.

2. A seal as defined in claim 1 in which said sealing element and said groove are sized to cause said second side to be deformed along said inclined sidewall to a thickness less than 0.015 of an inch, the thickness of said sealing element being not more than 0.015 of an inch greater than the depth of said groove.

3. A seal as defined in claim 1 in which said sealing element and said groove are formed with dimensions within respective permissible ranges of tolerances, the maximum permissible cross-sectional area of said sealing element being no greater than the maximum permissible void of said groove, and the position of said second side with nominal tolerance conditions being approximately midway along said inclined sidewall.

4. A seal as defined in claim 3 in which the position of said second side with maximum void and minimum volume of said element is spaced along said inclined sidewall from said bottom wall, and in which the position of said second side with minimum void and maximum volume of said element is spaced along said sidewall from said surface.

5. A seal as defined in claim 1 in which said sealing element is secured to said bottom wall with said one side adjacent the end of said inclined sidewall and with the other side of said sealing element against said first sidewall.

6. A seal for use between first and second members having opposed surfaces, said seal comprising:

means on said first member defining a groove in the surface thereof including a bottom wall spaced inwardly from the surface, a first sidewall along one side of said groove extending from said bottom wall to the surface, and a second sidewall along the other side of said groove extending from said bottom wall to the surface, said second sidewall being inclined outwardly and away from said second sidewall generally at an angle between 5° and 27° with the surface to reduce the depth of the groove progressively toward the surface of said other side;

and a sealing element composed of resilient deformable material and disposed in said groove for sealing engagement with the second member, said sealing element having a bottom for abutting against said bottom wall, a top spaced a preselected approximate distance beyond said surface, and first and second sides facing respectively toward the first and second sidewalls of said groove;

said seal having a volume less than the void defined by said groove so as to be pressed and deformed completely into and confined within the groove when said first member is placed against said second member, but sufficient to cause said second side to be deformed along said inclined sidewall into an intermediate position along said inclined sidewall between said bottom wall and said surface.

7. A seal as defined in claim 6 in which said sealing element is of uniform polygonal cross-section.

8. A seal as defined in claim 6 in which said sealing element and said groove are sized to cause said second side to be deformed along said inclined sidewall to a thickness less than 0.015 of an inch.

9. A seal as defined in claim 6 which said angle is on the order of 10°.

10. A seal as defined in claim 6 in which said sealing element is rectangular in cross-section and said first sidewall is substantially normal to said surface and to said bottom wall.

11. A seal as defined in claim 6 in which said groove and said sealing element are endless and of substantially uniform cross-sections.

12. A seal as defined in claim 6 in which the thickness of said sealing element is not more than 0.015 of an inch greater than the depth of said groove.

13. A seal as defined in claim 6 in which said sealing element and said groove are formed with dimensions within respective permissible ranges of tolerances, the maximum permissible cross-sectional area of said sealing element being no greater than the maximum permissible void of said groove, and the position of said second side with nominal tolerance conditions being approximately midway along said inclined sidewall.

14. A seal as defined in claim 13 in which the position of said second side with maximum void and minimum volume of said element is spaced along said inclined sidewall from said bottom wall, and in which the position of said second side with minimum void and maximum volume of said element is spaced along said sidewall from said surface.

15. A seal comprising:
a pair of ring-like retaining members disposed in side-by-side relation and having oppositely facing remote sides for engagement with two spaced and continuous surfaces to be sealed;
first means defining a groove in each of said remote sides, each of said grooves having a bottom wall and at least one sidewall inclined from said bottom wall to said remote side generally at an angle between 5° and 27° to progressively reduce the depth of the groove;
first resiliently deformable sealing elements in said grooves disposed against the bottom wall of the grooves and each having one side facing toward said inclined sidewall, each of said elements being thicker than the depth of the associated groove and having a cross-sectional area less than the cross-sectional area of the groove and preselected to cause said one side to be deformed to an intermediate position along said inclined sidewall when the element is deformed completely into the groove;
second means defining aligned grooves in said retaining members on the adjacent sides thereof, said second means including a bottom wall and a sidewall for each groove inclined in one direction from the bottom wall thereof to said adjacent side generally at an angle between 5° and 27° to progressively reduce the depth of the grooves in said one direction;
a second resiliently deformable sealing element disposed in said second grooves and engaging both bottom walls thereof, said second sealing element having one side facing toward said inclined sidewalls and being thicker than the combined depths of said second grooves, said second element having a cross-sectional area less than the combined cross-sectional areas of said second grooves whereby said one side is deformed in said one direction to an intermediate position along said inclined sidewalls when said retaining members are together;
and means forming a continuous tongue-and-groove connection between said retaining members on the adjacent sides thereof and along the sides of said second grooves opposite said inclined sidewalls, thereby forming a backing for said second sealing element and maintaining said backing in different partially separated conditions of said retaining members.

16. A seal as defined in claim 15 in which said tongue-and-groove connection comprises a continuous rib on one of said members having a sidewall forming a common sidewall of said second grooves, and a continuous groove in the other of said members around the second groove therein slidably receiving said rib and thereby keying said members against edgewise displacement while permitting movement of the members toward and away from each other.

17. A seal as defined in claim 15 in which each of said members has an edge defining a center hole, and said first and second grooves extend around said center hole with said inclined sidewalls on the sides of said grooves adjacent the center holes.

18. A seal as defined in claim 17 in which the adjacent sides of said members are inclined to diverge away from each other between said second grooves and said center holes and form first pressure surfaces of first preselected areas for exposure to pressure fluid from said centerholes, and in which said remote sides of said members have similar but oppositely inclined second pressure surfaces between said first grooves and said center holes, said second pressure surfaces having second preselected areas less than said first areas whereby pressure fluid acting on all of said surfaces tends to separate said members to maintain said first sealing elements in engagement with the surfaces to be sealed.

19. A seal comprising:
a pair of ring-like retaining members disposed in side-by-side relation and having oppositely facing remote sides for engagement with two spaced and continuous surfaces to be sealed;
first means defining a continuous groove in each of said remote sides;
first resiliently deformable sealing elements disposed in said grooves and each being thicker than the depth of the associated groove to be deformed completely into the latter when the retaining members are clamped between the surfaces to be sealed;
second means defining aligned continuous grooves in said retaining members on the adjacent sides thereof;
a second resiliently deformable sealing element disposed in said second grooves and thicker than the combined depths thereof so as to be deformed completely into the second grooves when said retaining members are together;
and means forming a continuous tongue-and-groove connection between said retaining members on the adjacent sides thereof and along the radially outer sides of said second grooves, thereby forming a backing for said second sealing element and maintaining said backing in different partially separated conditions of said retaining members.

20. A seal as defined in claim 19 in which said tongue-and-groove connection includes a continuous rib on one of said members having a sidewall forming a common sidewall for said second grooves.

21. A seal as defined in claim 20 in which each of said members has an edge defining a center hole, and said first and second grooves and sealing elements extend around said center hole to prevent the escape of pressure fluid therefrom.

22. A seal as defined in claim 21 in which the adjacent sides of said members are inclined to diverge away from each other between said second grooves and said center holes and form first pressure surfaces of first preselected areas for exposure to pressure surfaces between said first grooves and said center holes, said second pressure surfaces having second preselected areas less than said first areas whereby pressure fluid acting on all of said surfaces tends to separate said members to maintain said first sealing elements in engagement with the surfaces to be sealed.

* * * * *